(12) United States Patent
Monjiyama et al.

(10) Patent No.: US 12,378,336 B2
(45) Date of Patent: Aug. 5, 2025

(54) DEWAXING AID

(71) Applicant: NOF CORPORATION, Shibuya-ku (JP)

(72) Inventors: Shunsuke Monjiyama, Nishinomiya (JP); Hideki Kawamoto, Nishinomiya (JP); Kazuhiro Oda, Nishinomiya (JP)

(73) Assignee: NOF CORPORATION, Shibuya-ku (JP)

( * ) Notice: Subject to any disclaimer, the term of this patent is extended or adjusted under 35 U.S.C. 154(b) by 529 days.

(21) Appl. No.: 17/789,744

(22) PCT Filed: Jan. 12, 2021

(86) PCT No.: PCT/JP2021/000701
§ 371 (c)(1),
(2) Date: Jun. 28, 2022

(87) PCT Pub. No.: WO2021/145309
PCT Pub. Date: Jul. 22, 2021

(65) Prior Publication Data
US 2023/0056638 A1 Feb. 23, 2023

(30) Foreign Application Priority Data

Jan. 17, 2020 (JP) ................. 2020-005691

(51) Int. Cl.
| | | |
|---|---|---|
| C08F 210/16 | (2006.01) | |
| B01J 20/26 | (2006.01) | |
| C08F 20/18 | (2006.01) | |
| C08F 210/02 | (2006.01) | |
| C08L 23/08 | (2025.01) | |
| C08L 33/08 | (2006.01) | |
| C10G 73/04 | (2006.01) | |
| C08L 23/0807 | (2025.01) | |

(52) U.S. Cl.
CPC ........... *C08F 210/02* (2013.01); *B01J 20/261* (2013.01); *C10G 73/04* (2013.01); *C08F 20/18* (2013.01); *C08F 210/16* (2013.01); *C08F 2800/20* (2013.01); *C08L 23/0815* (2013.01); *C08L 33/08* (2013.01); *C10G 2400/10* (2013.01)

(58) Field of Classification Search
None
See application file for complete search history.

(56) References Cited

U.S. PATENT DOCUMENTS

| | | | |
|---|---|---|---|
| 3,792,983 A * | 2/1974 | Tunkel | C08F 10/00 44/393 |
| 4,192,733 A | 3/1980 | Onodera et al. | |
| 5,180,483 A | 1/1993 | Braams et al. | |
| 5,423,890 A | 6/1995 | More et al. | |
| 5,525,128 A | 6/1996 | McAleer et al. | |
| 5,674,300 A | 10/1997 | McAleer et al. | |
| 2010/0093568 A1 | 4/2010 | Tagawa et al. | |
| 2010/0192456 A1 | 8/2010 | Krull et al. | |
| 2012/0046205 A1 | 2/2012 | Tagawa et al. | |
| 2012/0053094 A1 | 3/2012 | Tagawa et al. | |
| 2012/0053096 A1 | 3/2012 | Tagawa et al. | |
| 2012/0053097 A1 | 3/2012 | Tagawa et al. | |
| 2012/0053102 A1 | 3/2012 | Tagawa et al. | |
| 2012/0053375 A1 | 3/2012 | Tagawa et al. | |
| 2015/0011770 A1* | 1/2015 | Lee | B01J 31/0244 546/166 |
| 2017/0175028 A1 | 6/2017 | Yamamoto et al. | |

FOREIGN PATENT DOCUMENTS

| | | |
|---|---|---|
| CA | 2 863 867 A1 | 8/2013 |
| CN | 1055553 A | 10/1991 |
| CN | 1648217 A | 8/2005 |
| CN | 104080825 A | 10/2014 |
| CN | 106103506 A | 11/2016 |
| GB | 1123325 A | 8/1968 |
| GB | 1 303 074 | 4/1970 |
| JP | 50-7603 B | 3/1975 |
| JP | 54-11104 A | 1/1979 |
| JP | 59-50199 B2 | 12/1984 |
| JP | 4-288398 A | 10/1992 |
| JP | 4-77598 B2 | 12/1992 |
| JP | 5-504987 A | 7/1993 |
| JP | 2002-97477 A | 4/2002 |
| JP | 2004-231928 A | 8/2004 |
| JP | 2008-13819 A | 1/2008 |
| JP | 2010-530454 A | 9/2010 |
| WO | WO 2013/126141 A1 | 8/2013 |

OTHER PUBLICATIONS

International Search Report issued Mar. 2, 2021 in PCT/JP2021/000701 filed Jan. 12, 2021, 4 pages.
Combined Chinese Office Action and Search Report issued Mar. 7, 2024, in corresponding Chinese Patent Application No. 202180007838.1 (with English Translation and English Translation of Category of Cited Documents), 10 pages.

* cited by examiner

Primary Examiner — Richard A. Huhn
(74) Attorney, Agent, or Firm — Oblon, McClelland, Maier & Neustadt, L.L.P.

(57) ABSTRACT

The dewaxing aid of the present invention is a dewaxing aid including an ethylene-α-olefin copolymer (A) having a molar ratio [(a)/(b)] of (a) ethylene and (b) an α-olefin having 3 or more and 12 or less carbon atoms of 93/7 to 75/25, and having a weight average molecular weight of 10,000 to 500,000. According to the present invention, a dewaxing aid that is excellent in improving filterability can be provided.

7 Claims, No Drawings

DEWAXING AID

TECHNICAL FIELD

The present invention relates to a dewaxing aid in solvent dewaxing. Specifically, the present invention relates to an aid for improving filterability in the filtration removal of a wax from a mineral oil, etc.

BACKGROUND ART

In general, lubricating oil bases for use in lubricating oil compositions are produced so as to have desired physical properties by carrying out a distillation treatment on a crude oil, and then subjecting to various purification treatments. In many cases of methods for producing a lubricating oil base oil, an unpurified distillation oil that has undergone a distillation treatment contains a large amount of paraffin wax (hereinafter also simply referred to as "wax content"), and thus has a high pour point. In order to form a lubricating oil base oil having a low pour point, a dewaxing treatment for removing a wax content from a distillation oil is carried out.

Generally, a dewaxing treatment is carried out by using a solvent dewaxing apparatus, by adding a solvent such as methyl ethyl ketone to a dewaxing raw material, which is a distillation oil containing a wax content, and mixing to form a mixed oil, and then precipitating the wax content by cooling said mixed oil to a temperature lower than a desired pour point. Furthermore, the mixed oil in which the wax content has precipitated is separated by filtration into a wax content and a dewaxing oil through a filter.

In recent years, increasing of treatment amounts in dewaxing treatments is required in accordance with the increase in demand for lubricating oil base oils. However, there is a problem that, even the supply amount of a dewaxing raw material is increased, the treatment amount cannot be increased sufficiently since the filtration velocity at a filter is slow. In some cases, various polymers are added as dewaxing aids so as to improve the filter filterability in dewaxing treatments. Dewaxing aids improve filterability by controlling the crystalline structure and flocculation form of the wax to be precipitated. For example, Patent Literature 1 discloses a mixed system of an olefin-vinyl acetate copolymer and a polyalkyl (meth)acrylate, Patent Literature 2 discloses a condensate of paraffin chloride and biphenyl, and Patent Literature 3 discloses a dewaxing aid including a polyalkyl (meth)acrylate, respectively.

CITATION LIST

Patent Literature

PTL 1: JP 54-011104 A
PTL 2: JP 04-077598 A
PTL 3: JP 2004-231928 A

SUMMARY OF INVENTION

Technical Problem

However, the effect to improve filterability was insufficient in conventional dewaxing aids, and thus a dewaxing aid having a higher improving effect has been demanded.

The problem to be solved by the present invention is to provide a dewaxing aid that is excellent in improving filterability.

Solution to Problem

The present inventors did intensive studies so as to solve the above-mentioned problem, and consequently found that a dewaxing aid including a specific ethylene-α-olefin copolymer obtained from ethylene and a specific α-olefin is excellent in improving filterability.

That is, the present invention provides the following [1] and [2].

[1] A dewaxing aid including an ethylene-α-olefin copolymer (A) having a molar ratio [(a)/(b)] of (a) ethylene and (b) an α-olefin having 3 or more and 12 or less carbon atoms of 93/7 to 75/25, and having a weight average molecular weight of 10,000 to 500,000.

[2] A dewaxing aid including an ethylene-ethyl acrylate copolymer (B) having a molar ratio [(c)/(d)] of (c) ethylene and (d) ethyl acrylate of 98/2 to 80/20, and having a weight average molecular weight of 50,000 to 1,000,000, and the copolymer (A) described in [1] at a ratio of (A)/(B)=95/5 to 70/30 (mass ratio).

Advantageous Effects of Invention

The dewaxing aid of the present invention is excellent in improving filterability in removing a wax from a mineral oil, etc. by using a solvent by filtration.

DESCRIPTION OF EMBODIMENTS

Hereinafter the dewaxing aid of the present invention is explained. Incidentally, a numerical range defined by using the symbol "to" in the present specification shall include the numerical value of both sides (upper limit and lower limit) of "to". For example, "2 to 5" represents 2 or more and 5 or less.

The present invention is a dewaxing aid including an ethylene-α-olefin copolymer (A) having a molar ratio [(a)/(b)] of (a) ethylene and (b) an α-olefin having 3 or more and 12 or less carbon atoms of 93/7 to 75/25, and having a weight average molecular weight of 10,000 to 500,000.

The ethylene-α-olefin copolymer (A) in the present invention is a copolymer that is obtained by polymerizing ethylene and an α-olefin having 3 or more and 12 or less carbon atoms.

An α-olefin having 3 or more and 12 or less carbon atoms is used as the raw material for the above-mentioned copolymer in the present invention. In view of filterability, it is preferably an α-olefin having 4 or more and 8 or less carbon atoms, further preferably an α-olefin having 4 carbon atoms. Examples of the α-olefin having 3 or more and 12 or less carbon atoms include propylene, 1-butene, 1-pentene, 4-methyl-1-pentene, 1-hexene, 1-octene, 1-decene, and 1-dodecene.

The weight average molecular weight of the ethylene-α-olefin copolymer (A) in the present invention is 10,000 to 500,000. Said weight average molecular weight is preferably 30,000 to 300,000, more preferably 40,000 to 200,000, and further preferably 50,000 to 150,000. If the weight average molecular weight is lower than 10,000, the filterability may not be improved. On the other hand, if the weight average molecular weight is more than 500,000, the viscosity is high and the handling property may be deteriorated. Incidentally, the weight average molecular weight in the present invention is a value obtained in terms of polystyrene measured by using gel permeation chromatography (GPC) under the following conditions.

<Measurement Conditions>
- Apparatus: HLC-8220 manufactured by Tosoh Corporation
- Column: LF-804 manufactured by shodex
- Standard substance: polystyrene
- Eluant: THF (tetrahydrofuran)
- Flow amount: 1.0 ml/min
- Temperature: 40° C.
- Detector: RI (differential refractive index detector)

The ethylene-α-olefin copolymer (A) in the present invention includes (a) ethylene and (b) an α-olefin having 3 or more and 12 or less carbon atoms at a molar ratio of (a)/(b)=93/7 to 75/25. Incidentally, the molar ratio of (a) ethylene and (b) an α-olefin having 3 or more and 12 or less carbon atoms means a molar ratio of a constitutional unit derived from ethylene and a constitutional unit derived from an α-olefin having 3 or more and 12 or less carbon atoms which are present in the ethylene-α-olefin copolymer. The molar ratio [(a)/(b)] of (a) ethylene and (b) an α-olefin having 3 or more and 12 or less carbon atoms is preferably 92/8 to 80/20, more preferably 90/10 to 83/17, and further preferably 90/10 to 85/15. When the molar ratio of (a) ethylene and (b) an α-olefin having 3 or more and 12 or less carbon atoms is out of 93/7 to 75/25, the filterability may not be improved.

Incidentally, "molar ratio" in the present invention can be calculated by dissolving an ethylene-α-olefin copolymer in deuterated toluene and measuring $^1$HNMR. Specifically, the molar ratio of the ethylene and the α-olefin can be calculated from a ratio of integrated values of a peak derived from the terminal methyl of the α-olefin (0.40 to 0.60 ppm) and a peak derived from the ethylene and peaks derived from the alkyls other than the terminal methyl of the α-olefin (0.85 to 1.05 ppm).

<Measurement Conditions>
- Apparatus: JNM-AL manufactured by JEOL
- Frequency: 400 MHz
- Solvent: Deuterated toluene
- Concentration: 10 g/L
- Temperature: 60° C.

It is preferable for the ethylene-α-olefin copolymer (A) contained in the dewaxing aid in the present invention to use two or more kinds of ethylene-α-olefin copolymers having different molar ratios [(a)/(b)] in combination. More specifically, it is more preferable to use the two kinds: an ethylene-α-olefin copolymer $(A_H)$, and an ethylene-α-olefin copolymer $(A_L)$ having different molar ratios [(a)/(b)] to each other. The mixing ratio of $(A_H)$ and $(A_L)$ is not specifically limited, but those having a mass ratio $(A_H)/(A_L)$ of 90/10 to 10/90 are preferable.

The mass ratio $(A_H)/(A_L)$ is more preferably 75/25 to 25/75, further preferably 60/40 to 40/60, specifically preferably 50/50. If the mass ratio is within the range of 90/10 to 10/90, the effect of improving filterability is further improved easily. In the case where $(A_H)$ and $(A_L)$ are used in combination, it is preferable to use the following $(A_H)$ and $(A_L)$.

$(A_H)$: an ethylene-α-olefin copolymer having a molar ratio [(a)/(b)] of (a) ethylene and (b) an α-olefin having 3 or more and 12 or less carbon atoms of 93/7 to 87/13, and having a weight average molecular weight of 10,000 to 500,000

$(A_L)$: an ethylene-α-olefin copolymer having a molar ratio [(a)/(b)] of (a) ethylene and (b) an α-olefin having 3 or more and 12 or less carbon atoms of lower than 87/13 and 75/25 or more, and having a weight average molecular weight of 10,000 to 500,000

Furthermore, from the viewpoint of filterability, the α-olefin contents of $(A_H)$ and $(A_L)$ are different by preferably 1 mol % or more, more preferably by 2 mol % or more.

The ethylene-α-olefin copolymer (A) in the present invention can further enhance the effect of improving filterability by combination use with a specific ethylene-ethyl acrylate. More specifically, by using an ethylene-ethyl acrylate copolymer (B) having a molar ratio [(c)/(d)] of (c) ethylene and (d) ethyl acrylate of 98/2 to 80/20, and having a weight average molecular weight of 50,000 to 1,000,000 at a ratio of (A)/(B)=95/5 to 70/30 (mass ratio) in combination, the effect to improve filterability can further be enhanced.

The mass ratio of (A)/(B) is more preferably 90/10 to 75/25, further preferably 85/15 to 75/25. By using at this range in combination, the effect to improve filterability can further be enhanced.

The above-mentioned ethylene-ethyl acrylate copolymer (B) has a weight average molecular weight of 50,000 to 1,000,000. Said weight average molecular weight is preferably 60,000 to 800,000, more preferably 70,000 to 600,000, further preferably 75,000 to 500,000. By using the ethylene-ethyl acrylate copolymer having a weight average molecular weight in this range in combination, the effect to improve filterability can further be enhanced.

The above-mentioned ethylene-ethyl acrylate copolymer (B) has a molar ratio [(c)/(d)] of (c) ethylene and (d) ethyl acrylate of 98/2 to 80/20. Incidentally, the molar ratio of (c) ethylene and (d) ethyl acrylate means a molar ratio of a constitutional unit derived from the ethylene and a constitutional unit derived from the ethyl acrylate which are present in the ethylene-ethyl acrylate copolymer. The molar ratio [(c)/(d)] of (c) ethylene and (d) ethyl acrylate is preferably 98/2 to 82/18, more preferably 96/4 to 84/16, further preferably 92/8 to 86/14. By using an ethylene-ethyl acrylate copolymer having a molar ratio [(c)/(d)] in this range in combination, the effect to improve filterability can further be enhanced.

Incidentally, the "molar ratio" of (c) ethylene and (d) ethyl acrylate can be calculated by dissolving the ethylene-ethyl acrylate copolymer in deuterated chloroform and measuring $^1$HNMR. Specifically, the molar ratio of the ethylene and the ethyl acrylate can be calculated from a ratio of integrated values of a peak derived from the alkyl of —COOCH$_2$— in the ethyl acrylate (4.00 to 4.20 ppm), a peak derived from the ethylene and peaks derived from the alkyls other than the alkyl of —COOCH$_2$— of the ethyl acrylate (0.70 to 1.70 ppm).

The dewaxing aid may be used by diluting with a diluent in view of workability. Examples of the diluent include mineral oils and aromatic solvents starting from crude oils as raw materials, such as kerosene base components, light oil base components, toluene, and xylene.

In the case where the dewaxing aid is diluted with a diluent, the content of the diluent is, for example, 0.05 to 20 parts by mass, preferably 1 to 15 parts by mass, more preferably 2 to 10 parts by mass, with respect to 1 part by mass of the dewaxing aid.

The dewaxing aid of the present invention can contain other optional components as necessary. Examples of the optional components include polyalkyl (meth)acrylates, and alkylated aromatic compounds. The dewaxing aid may also be adjusted by appropriately mixing these optional components with the above-mentioned ethylene-α-olefin copolymer as desired at an amount within the range in which the object of the present invention is not inhibited.

Furthermore, as mentioned above, the dewaxing aid of the present invention may be used by diluting with a diluent. Incidentally, the diluent is incorporated in the dewaxing aid, and is a component other than the components that may be contained in the dewaxing aid.

The dewaxing aid of the present invention can be preferably used for removing a wax by filtration from a mineral oil, etc. Specifically, the dewaxing aid of the present invention is preferably used by being added to a wax-containing hydrocarbon oil in a petroleum distilled oil, etc. to remove a wax by filtration.

In the case where the dewaxing aid of the present invention is added to a wax-containing hydrocarbon oil, the addition amount thereof is not specifically limited, and the dewaxing aid is added so that the amount of the ethylene-α-olefin copolymer contained in the dewaxing aid becomes, for example, 10 to 3,000 ppm, preferably 50 to 500 ppm, more preferably 200 to 500 ppm, with respect to the wax-containing hydrocarbon oil. In the case where the addition amount is too small, a sufficient effect cannot be obtained, whereas when the dewaxing aid is added at an amount more than needed, the effect may not be improved but may conversely be decreased.

It is preferable to add the dewaxing aid to a mixed oil in which the wax-containing hydrocarbon oil and a solvent have been mixed. Examples of the solvent herein include methyl ethyl ketone, acetone, methyl isobutyl ketone, toluene, butane, and pentane, and two or more kinds of solvents may be mixed and used. Although the mass ratio of the wax-containing hydrocarbon oil to the solvent (wax-containing hydrocarbon oil/solvent) is not specifically limited, it is preferably 50/50 to 5/95, more preferably 30/70 to 10/90. The dewaxing aid is added to the above-mentioned mixed oil, the mixed oil is then heated to allow homogeneous dissolution and cooled to allow the wax to precipitate, and said precipitated wax is removed by filtration. The heating temperature during the heating is preferably 40 to 90° C., and the cooling temperature during the cooling is preferably −40 to −20° C.

The dewaxing aid of the present invention is excellent in wax filterability, and thus enables effective removal of a wax.

Examples of the wax-containing hydrocarbon oils include petroleum distilled oils, and examples of the petroleum distilled oils used in the present invention may include residue oils and the like that accumulated on the tower bottom of a distillation tower, which are obtainable by distillation at an ordinary pressure or distillation at a reduced pressure, for example, crude oils such as paraffin-based crude oils, intermediate base crude oils and naphthene-based crude oils. Said residue oils have a high weight average molecular weight, and are used as raw materials for bright stocks obtainable by carrying out a dewaxing treatment and various purification treatments.

The weight average molecular weight of the petroleum distilled oil used in an embodiment of the present invention is 900 or more, preferably 1,000 or more, more preferably 1,100 or more, further preferably 1,200 or more, further more preferably 1,300 or more, and is generally 3,000 or less.

The petroleum distilled oil used in an embodiment of the present invention has a kinetic viscosity at 100° C. of preferably 20.0 to 60.0 mm$^2$/s, more preferably 23.0 to 55.0 mm$^2$/s, further preferably 25.0 to 50.0 mm$^2$/s. Incidentally, the kinetic viscosity in the present specification means a value that was measured and calculated according to JIS K2283: 2000.

The petroleum distilled oil used in an embodiment of the present invention has a flash point of preferably 300° C. or more, more preferably 310° C. or more, further preferably 320° C. or more, and generally 350° C. or less. Incidentally, the flash point in the present specification means a value measured by the Cleveland open-cup (COC) test according to JIS K2265-4.

Furthermore, the petroleum distilled oil used in an embodiment of the present invention has a pour point of generally 40 to 50° C. Incidentally, the pour point in the present specification means a value measured according to JIS K2269: 1987.

EXAMPLES

The present invention will further be explained below in detail with referring to Examples and Comparative Examples. However, the present invention is not limited by these examples.

[Ethylene-α-Olefin Copolymer (A)]

Synthesis Example 1

To a stirring autoclave type continuous reactor were continuously supplied a mixture of ethylene and 1-butene so that the ratio of the 1-butene became 35 mol % (the total amount of the ethylene and the 1-butene was set to 100 mol %), and a polymerization reaction was carried out in the presence of a metallocene-based catalyst at a pressure of 92 MPa and a temperature of 194° C. to give Polymerized product $A_H$-1. As the metallocene-based catalyst, a catalyst including dimethylsilylenebis (4, 5, 6,7-tetrahydroindenyl) hafniumdimethyl/tri(pentafluorophenyl)boron=½ (molar ratio) was used.

Incidentally, Polymerized products $A_H$-2 and $A_H$-3 in Table 1, Polymerized products $A_L$-1 and $A_L$-2 in Table 2, and Polymerized products A'-1 and A'-2 in Table 3 were obtained by carrying out operations in accordance with Synthesis Example 1 with changing the ratio of the 1-butene in Synthesis Example 1, and with appropriately changing the 1-butene to another α-olefin.

[Ethylene-Ethyl Acrylate Copolymer (B)]

Synthesis Example 2

To a stirring autoclave type continuous reactor were continuously charged a mixture of an organic peroxide and ethylene with ethyl acrylate so that the ratio of the ethyl acrylate became 3 mol % (the total amount of the ethylene and the ethyl acrylate was set to 100 mol %), and a polymerization reaction was carried out at a pressure of 130 MPa and a temperature of 195° C. to give Polymerized product B1 in Table 4. As the organic peroxide, t-butylperoxy-2-ethylhexanoate was used.

Incidentally, Polymerized product B2 in Table 4 was obtained by changing the ratio of the ethyl acrylate in Synthesis Example 2, and by carrying out operations in accordance with Synthesis Example 2.

Synthesis Example 3

To a reactor equipped with a thermometer, a nitrogen introduction tube, a stirrer and a heating apparatus were charged toluene/alkyl methacrylates=12/88 (mass ratio), and a polymerization reaction was carried out under a nitrogen atmosphere at a temperature of 80° C. while adding an azo-based initiator. After the reaction, the toluene was removed under a reduced pressure at a temperature of 120° C. to give Polymerized product C having a weight average molecular weight of 190,000. C12-22 alkyl methacrylates (C12/C14/C16/C18/C20/C22=4/8/4/35/15/35, mass ratio) were used as the alkyl methacrylates, and 2,2-azobis-2,4-dimethylvaleronitrile was used as the azo-based initiator. Incidentally, "C12", etc. means that an alkyl group has 12 carbon atoms.

TABLE 1

| Polymerized product | Kind of polymerized product | Kind of α-olefin Compound | Carbon number | Molar ratio (a)/(b) | Weight average molecular weight |
|---|---|---|---|---|---|
| $A_H$-1 | Ethylene-α-olefin copolymer | 1-Butene | 4 | 89/11 | 63,000 |
| $A_H$-2 | Ethylene-α-olefin copolymer | 1-Octene | 8 | 87/13 | 71,000 |
| $A_H$-3 | Ethylene-α-olefin copolymer | 1-Hexene | 6 | 92/8 | 41,000 |

TABLE 2

| Polymerized product | Kind of polymerized product | Kind of α-olefin Compound | Carbon number | Molar ratio (a)/(b) | Weight average molecular weight |
|---|---|---|---|---|---|
| $A_L$-1 | Ethylene-α-olefin copolymer | 1-Butene | 4 | 85/15 | 103,000 |
| $A_L$-2 | Ethylene-α-olefin copolymer | 1-Octene | 8 | 78/22 | 137,000 |

TABLE 3

| Polymerized product | Kind of polymerized product | Kind of α-olefin Compound | Carbon number | Molar ratio (a)/(b) | Weight average molecular weight |
|---|---|---|---|---|---|
| A'-1 | Ethylene-α-olefin copolymer | 1-Hexene | 6 | 95/5 | 322,000 |
| A'-2 | Ethylene-α-olefin copolymer | 1-Octene | 8 | 70/30 | 43,000 |

TABLE 4

| Polymerized product | Kind of polymerized product | Molar ratio (c)/(d) | Weight average molecular weight |
|---|---|---|---|
| B1 | Ethylene-ethyl acrylate copolymer | 88/12 | 145,000 |
| B2 | Ethylene-ethyl acrylate copolymer | 96/4 | 301,000 |

Preparation Example 1

Polymerized product $A_H$-1, Polymerized product $A_L$-1 and Polymerized product B1 were charged at 40:40:20 (mass ratio), and mixed at a temperature of 100° C. to prepare Dewaxing aid D1.

Incidentally, Dewaxing aids D2 and D3 in Table 5 were prepared by changing the polymerized product in Preparation Example 1 and carrying out operations in accordance with Preparation Example 1.

Furthermore, the polymerized products described in Table 5 were set as Dewaxing aids D4 to D12.

TABLE 5

| Dewaxing aids | | $A_H$-1 | $A_H$-2 | $A_H$-3 | $A_L$-1 | $A_L$-2 | A'-1 | A'-2 | B-1 | B-2 | C |
|---|---|---|---|---|---|---|---|---|---|---|---|
| D1 | Parts by mass | 40 | | | 40 | | | | 20 | | |
| D2 | | | | | | 80 | | | | 20 | |
| D3 | | 50 | | | 50 | | | | | | |
| D4 | | 100 | | | | | | | | | |
| D5 | | | | | 100 | | | | | | |
| D6 | | | 100 | | | | | | | | |
| D7 | | | | 100 | | | | | | | |
| D8 | | | | | | 100 | | | | | |
| D9 | | | | | | | 100 | | | | |
| D10 | | | | | | | | 100 | | | |
| D11 | | | | | | | | | 100 | | |
| D12 | | | | | | | | | | | 100 |

Example 1

Dewaxing aid D1 and toluene (diluent) were charged at Dewaxing aid D1/toluene (diluent)=⅖ (mass ratio), and mixed by stirring at a temperature of 100° C. to prepare Diluted solution E1 of the dewaxing aid.

To 150 g of a mixed oil prepared at a wax-containing hydrocarbon oil/methyl ethyl ketone/toluene=1/2/2 (mass ratio) was added 0.23 g (300 ppm as a polymerized product) of Diluted solution E1 of a dewaxing aid, which was separately prepared, and dissolved homogeneously by heating to a temperature of 70° C. The mixed oil was put into a test container, and cooled to a temperature of −30° C. at a velocity of 2° C./min while stirring. After cooling, the slurry in which the wax had precipitated was put into an aspiration filtering apparatus, and reduced pressure filtration was carried out at a temperature of −30° C., at 200 mmHg. The time when the slurry was put into the filtering apparatus was set as 0 sec, and the time when 100 mL of the filtrate had flowed was measured. The time when 100 mL had flowed was set as a filtration time, wherein a shorter filtration time means more excellent filterability. The result is shown in Table 6.

Incidentally, the evaluation was made as follows. A=the filtration time was shorter than 350 sec, B=the filtration time was 350 sec or more and shorter than 600 sec, C=the filtration time was 600 sec or more.

Furthermore, the filter material used in this test had an aeration amount=about 100 cm$^3$/cm$^2$ sec, and the "hydrocarbon oil" is a residue oil containing a wax content, which was obtained by hydrogenation purification of a residue oil that remains on a tower bottom in the reduced pressure distillation of a crude oil. Said residue oil has the structure and physical properties as follows. The weight average molecular weight (Mw)=1,440, the kinetic viscosity at 100° C.=30 mm$^2$/s, the pour point=45° C., the flash point=325° C.

Examples 2 to 8, and Comparative Examples 1 to 4

The filtration times were measured in a similar manner to that of Example 1, except that the dewaxing aid used in Example 1 was changed as shown in Table 6. The results are shown in Table 6.

Example 9

Similar operations to that of Example 1 were carried out, except that the addition amount of Diluted solution E1 of the dewaxing aid was changed to 0.11 g (150 ppm as a polymerized product). The result is shown in Table 7.

Examples 10 to 12, Comparative Examples 5 and 6

The filtration times were measured in a similar manner to that of Example 9, except that the dewaxing aid used in Example 9 was changed as shown in Table 7. The results are shown in Table 7.

TABLE 6

| | Dewaxing aid | Evaluation result [filtration time (sec)] |
|---|---|---|
| Example 1 | D1 | A [150] |
| Example 2 | D2 | A [225] |
| Example 3 | D3 | A [250] |
| Example 4 | D4 | A [300] |
| Example 5 | D5 | A [325] |
| Example 6 | D6 | B [375] |
| Example 7 | D7 | B [450] |
| Example 8 | D8 | B [500] |
| Comparative Example 1 | D9 | C [850] |
| Comparative Example 2 | D10 | C [900] |
| Comparative Example 3 | D11 | C [625] |
| Comparative Example 4 | D12 | C [650] |

TABLE 7

| | Dewaxing aid | Evaluation result [filtration time (sec)] |
|---|---|---|
| Example 9 | D1 | A [200] |
| Example 10 | D3 | A [300] |
| Example 11 | D4 | B [400] |
| Example 12 | D8 | B [575] |
| Comparative Example 5 | D10 | C [995] |
| Comparative Example 6 | D12 | C [850] |

From the results in Tables 6 and 7, Examples 1 to 12, in which the dewaxing aids of the present invention were used, had shorter filtration times as compared to those of Comparative Examples 1 to 6. Therefore, it was found that the dewaxing aids of the present invention significantly improved the filterability as compared to those of the dewaxing aids of Comparative Examples.

INDUSTRIAL APPLICABILITY

According to the present invention, a dewaxing aid that is excellent in improving filterability can be provided.

The invention claimed is:

1. A dewaxing aid, comprising:
an ethylene-α-olefin copolymer (A) having a molar ratio [(a)/(b)] of (a) ethylene and (b) an α-olefin having 3 or more and 12 or less carbon atoms of 93/7 to 75/25 and having a weight average molecular weight of 10,000 to 500,000; and
an ethylene-ethyl acrylate copolymer (B) having a molar ratio [(c)/(d)] of (c) ethylene and (d) ethyl acrylate of 98/2 to 80/20, and having a weight average molecular weight of 50,000 to 1,000,000 at a ratio of (A)/(B) =95/5 to 70/30 (mass ratio).

2. The dewaxing aid of claim 1, wherein the α-olefin (b) has 4 or more and 8 or less carbon atoms.

3. The dewaxing aid of claim 1, wherein the ethylene-α-olefin copolymer (A) has a weight average molecular weight of 50,000 to 150,000.

4. The dewaxing aid of claim 1, wherein the ethylene-α-olefin copolymer (A) has molar ratio [(a)/(b)] of 90/10 to 85/15.

5. The dewaxing aid of claim 1, wherein the ethylene-ethyl acrylate copolymer (B) has a weight average molecular weight of 75,000 to 500,000 at a ratio of (A)/(B) =95/5 to 70/30 (mass ratio).

6. The dewaxing aid of claim 1, wherein the ethylene-ethyl acrylate copolymer (B) has a molar ratio [(c)/(d)] of 92/8 to 86/14.

7. The dewaxing aid of claim 1, having a mass ratio (A)/(B) of the ethylene-α-olefin copolymer (A) to the ethylene-ethyl acrylate copolymer (B) of 90/10 to 75/25.

* * * * *